United States Patent [19]
DeJean et al.

[11] Patent Number: 5,243,423
[45] Date of Patent: Sep. 7, 1993

[54] SPREAD SPECTRUM DIGITAL DATA TRANSMISSION OVER TV VIDEO

[75] Inventors: Jean P. DeJean, Cincinnati, Ohio; Daozheng Lu, Buffalo Grove, Ill.; Robert Weissman, Westport, Conn.

[73] Assignee: A. C. Nielsen Company, Northbrook, Ill.

[21] Appl. No.: 811,805

[22] Filed: Dec. 20, 1991

[51] Int. Cl.$^5$ ............................................. H04N 7/08
[52] U.S. Cl. ...................................... 358/142; 358/141
[58] Field of Search ................... 358/142, 141, 167; 375/1

[56] References Cited

U.S. PATENT DOCUMENTS

| | | |
|---|---|---|
| 3,244,808 | 4/1966 | Roberts . |
| 3,562,420 | 2/1971 | Thompson . |
| 3,838,444 | 9/1974 | Loughlin et al. ............... 358/142 |
| 3,842,196 | 10/1974 | Loughlin ......................... 358/142 |
| 3,984,624 | 10/1976 | Waggener ....................... 358/142 |
| 4,363,138 | 12/1982 | Franklin et al. . |
| 4,425,642 | 1/1984 | Moses et al. . |
| 4,841,545 | 6/1989 | Endo et al. ............................ 375/1 |
| 4,912,721 | 3/1990 | Pidgeon, Jr. et al. . |
| 4,969,041 | 11/1990 | O'Grady et al. ................... 358/142 |

OTHER PUBLICATIONS

Spread Spectrum Goes Commerical by D. L. Schilling, R. L. Pickholtz, and L. B. Mistein, IEEE Spectrum Magazine, Aug. 1990, pp. 40-46.

Primary Examiner—James J. Groody
Assistant Examiner—David E. Harvey
Attorney, Agent, or Firm—Marshall, O'Toole, Gerstein, Murray & Borun

[57] ABSTRACT

A co-channel communication system allows transmission of one or more data signals in an active or visible portion of a video raster in a manner that is imperceptible to a viewer. More particularly, the data signal is transmitted over a preselected active video lines of a video raster. In order to reduce the perceptibility of the data signal, the video lines over which the data signal is transmitted is varied according to a random sequence. In an alternate embodiment, the data is also modulated at relatively low modulation levels, for example, by converting the data signal to a spread spectrum signal.

17 Claims, 4 Drawing Sheets

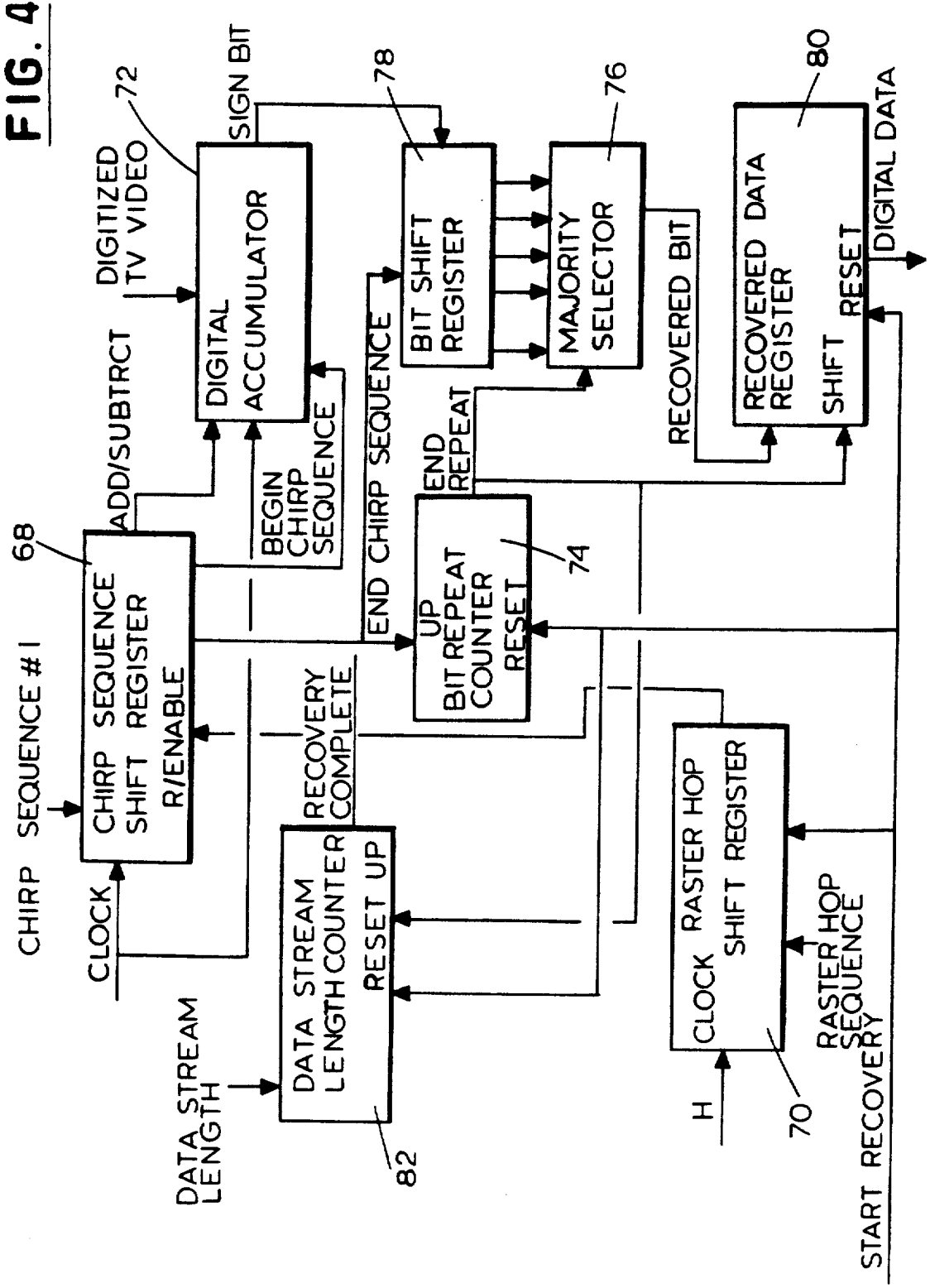

SPREAD SPECTRUM DIGITAL DATA TRANSMISSION OVER TV VIDEO

BACKGROUND OF THE INVENTION

1. Field of the Invention

The present invention relates to a co-channel communication system for concurrently transmitting a data signal with a video signal over a single communications channel and more particularly, to a communication system for transmitting data in an active or visible portion of a video raster in a manner that is imperceptible to a viewer.

2. Description of the Prior Art

Various communication systems are known in the art for transmitting data signals along with a video signal. Such data signals are known to be used for many different purposes, for example, program syndication verification, closed caption data and the like. These communication systems utilize various methods for transmitting such data along with the video signal. In some known systems, the data is transmitted in inactive portions of the video raster, such as during vertical blanking intervals. However, due to the increased demand for additional data, non-active portions of the video rasters are generally no longer available for data transmission. Other known systems place the data in an active portion of the video raster by modulating the data at low levels relative to the video signal. More specifically, in such systems, the data signal is normally transmitted over an active video line that appears near the top or bottom of the screen since a viewer is less likely to concentrate on a portion of the display away from the center of the screen. However, such data signals appear as noise and are still perceptible to the viewer.

Various other techniques are known for transmitting data signals along with a video signal For example, U.S. Pat. No. 3,244,808 to Roberts discloses a pulse code modulation (PCM) video communication system. In such systems, digital data is used to improve the picture quality. More specifically, in such a system, the picture quality is related to the number of bits utilized to encode the brightness level. In order to improve the picture quality in such a system while minimizing the channel bandwidth, a data signal is used to average the brightness level in a selected area of the video raster to reduce the contrast and thereby improve the picture quality. The data signal is added to the video signal by way of a pseudo-random sequence at the transmitter. The same pseudo-random sequence is used at the receiver in order to decode the data signal.

Spread spectrum techniques are also known for transmitting data over active video channels More specifically, U.S. Pat. No. 4,912,721 to Pigeon et al. discloses an interactive video communication system which utilizes spread spectrum signals for sending data from a cable TV household to a cable head end. More specifically, in such a communication system a return path is provided to allow a cable TV subscriber to communicate with a cable head end for a variety of purposes such as home shopping, voting, and the like.

U.S. Pat. No. 4,425,642 to Moses et al. discloses a co-channel communication system for transmitting a digital data signal simultaneously with a video or voice signal. The Moses et al. patent discloses the use of spread spectrum signals to transmit the digital data signal along a predetermined active video line. Although the use of spread spectrum signals greatly reduces the viewer perceptibility of the data signal, transmission of the data signal over a single active video line is still noticeable to a viewer

SUMMARY OF THE INVENTION

It is an object of the present invention to solve the problems associated with the prior art.

It is another object of the present invention to provide a communication system for simultaneously transmitting one or more data signals along active video lines.

It is yet another object of the present invention to transmit one or more data signals in an active portion of the video raster in a manner that is imperceptible to a viewer.

Briefly, the present invention relates to a co-channel communication system for transmitting data signals in an active or visible portion of a video raster in a manner that is imperceptible to a viewer. More particularly, the data signals are transmitted over preselected active video lines of the video raster. In order to reduce the perceptibility of the data signal, the selected video lines over which the data signals are transmitted are varied according to a random sequence. The data is also modulated at relatively low modulation levels, for example, by converting the data signal to a spread spectrum signal.

DESCRIPTION OF THE DRAWING

These and other objects and advantages of the present invention will become readily apparent upon consideration of the following detailed description and attached drawing, wherein:

FIG. 4 is a block diagram of a signal recovery circuit which forms a part of the demodulation circuit illustrated in FIG. 3.

DETAILED DESCRIPTION OF THE PREFERRED EMBODIMENT

Figure 1:
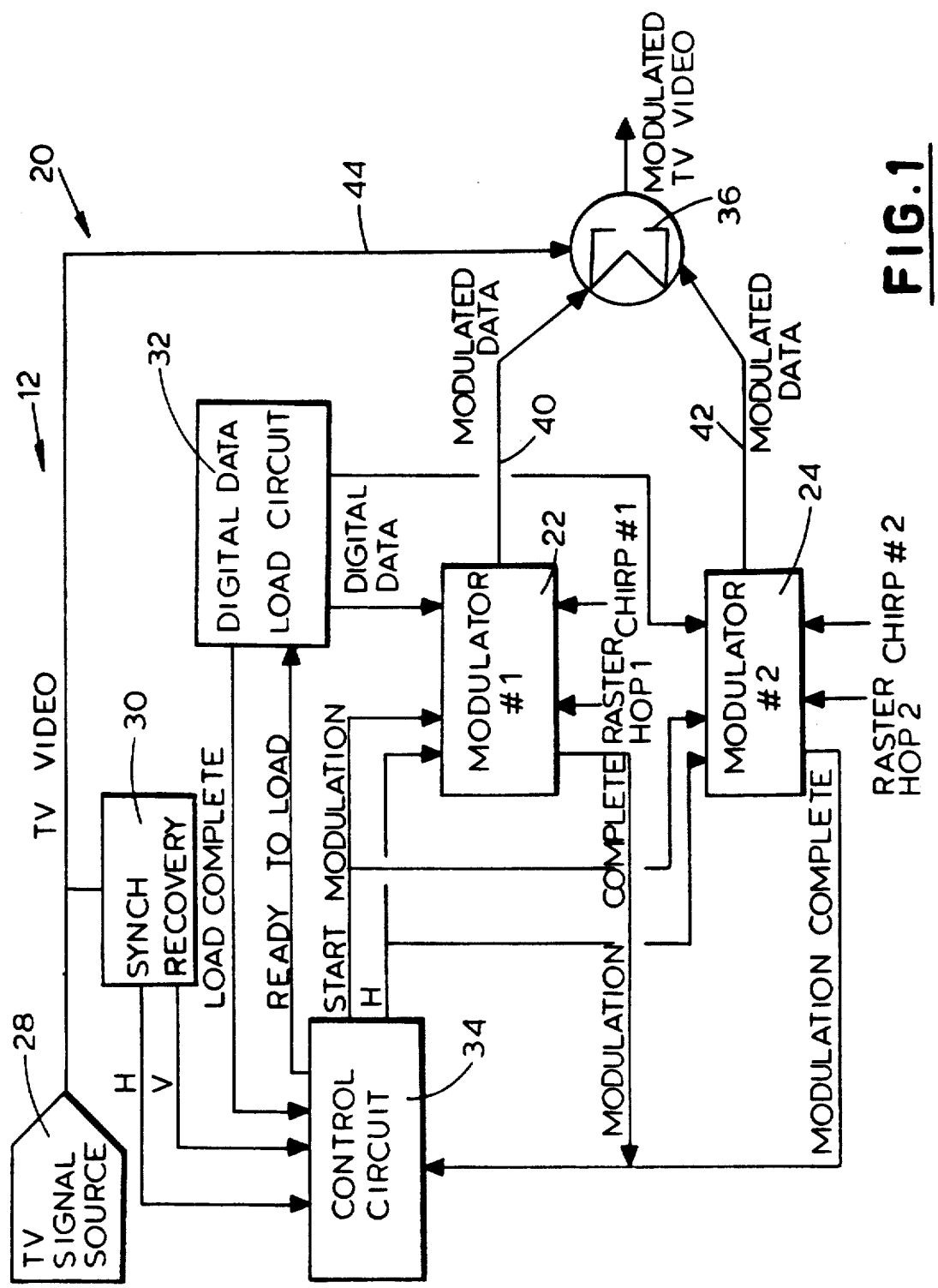
FIG. 1 is a block diagram of a modulation circuit in accordance with the present invention.

A co-channel communication system for transmitting data, such as digital data, in an active or visible portion of the video raster is generally identified with the reference numeral 20. An important aspect of the invention is that the data is transmitted in a manner that is relatively imperceptible to the viewer. The co-channel communication system in accordance with the present invention includes one or more modulators for modulating the data along active video lines of a video raster. In order to insure that the data is relatively imperceptible to a viewer, the active video lines upon which the data is modulated are varied according to a pseudo random sequence. In an alternate embodiment of the invention, the data is modulated at relatively low modulation levels, for example, by converting the data signals to spread spectrum signals.

Figure 2:
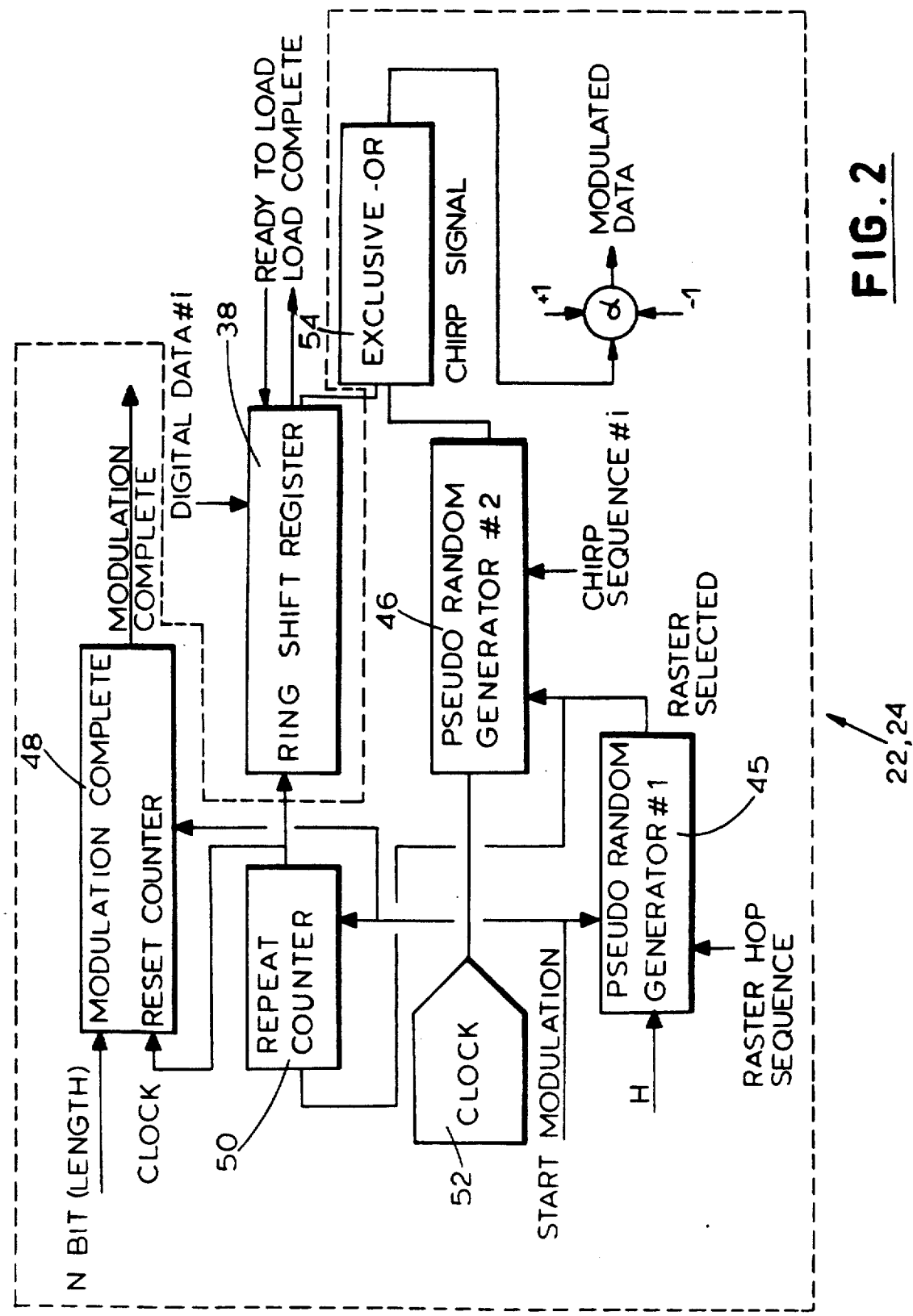
FIG. 2 is a block diagram of a modulator which forms a part of the modulation circuit illustrated in FIG. 1.
Figure 3:
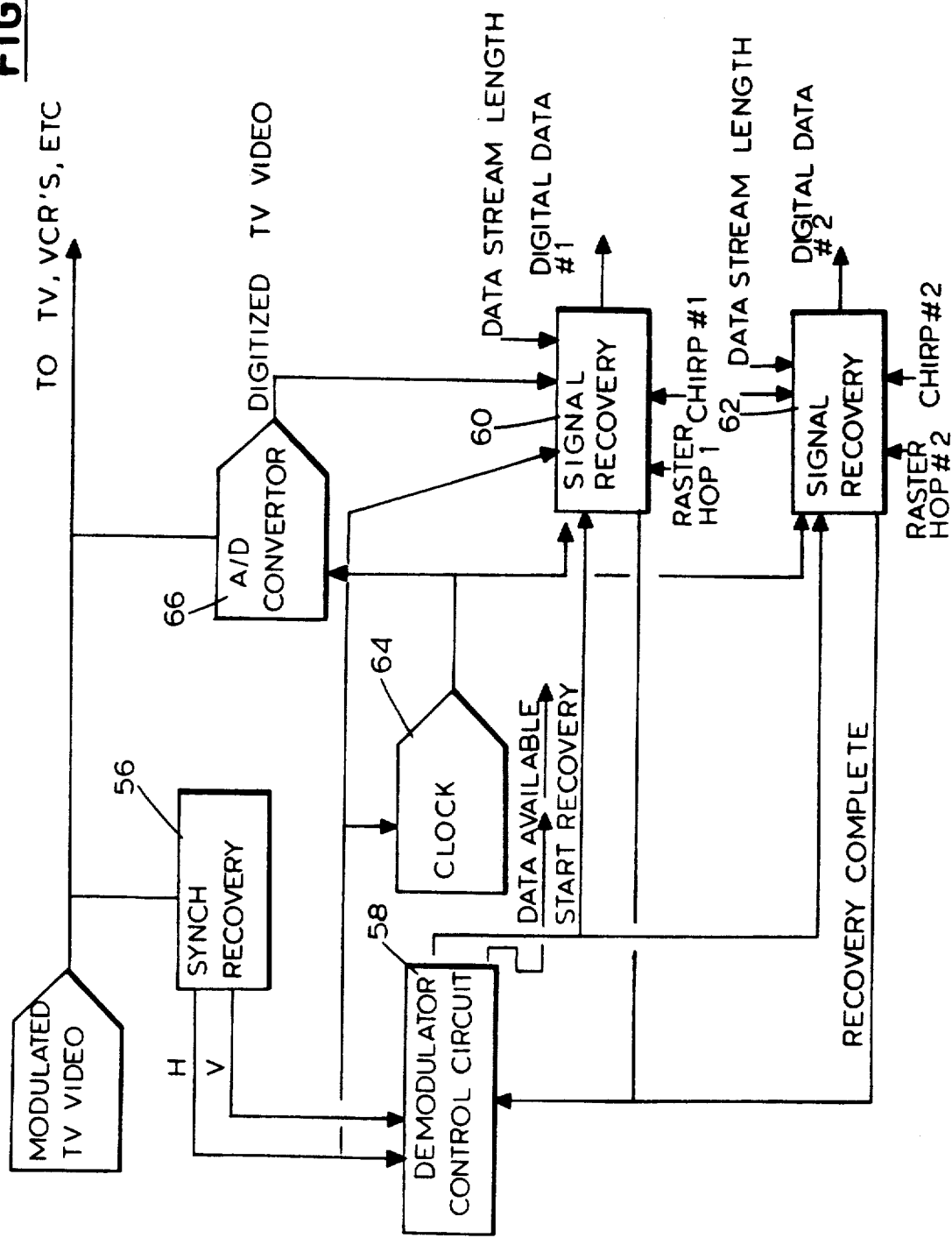
FIG. 3 is a block diagram of a demodulation circuit in accordance with the present invention.

The co-channel communication system in accordance with the present invention includes a modulation circuit as illustrated in FIGS. 1 and 2, and a demodulation circuit as illustrated in FIGS. 3 and 4. The co-channel communication system allows encoding of data for various purposes, including programs syndication verification, copyright marking, media research, closed caption data and the like along active video lines in a non-obtrusive manner.

Referring to FIG. 1, a block diagram of the modulation circuit in accordance with the present invention is illustrated. The modulation circuit includes one or more modulators 22 and 24, as will be discussed below, as well as a video signal source 28, a sync recovery circuit 30, a digital data load circuit 32, a control circuit 34 and a mixer or summing junction 36. Horizontal and vertical sync signals are recovered from a raster type video signal, available at the video signal source 28, by way of the sync recovery circuit 30. Such horizontal and vertical sync signal recovery circuits are generally well drawn in the art.

The recovered horizontal sync and vertical sync signals are utilized by the control circuit 34 in order to synchronize the modulation of the digital data along active video lines. More specifically, in one embodiment of the invention, a separate modulator is used for each field of the video frame. In such an embodiment the horizontal and vertical sync signals are used to alternatively enable the modulators 22 and 24. The modulated data along with the composite video signal are additively combined in the signal mixer 36 and transmitted to a video signal receiver.

The digital data corresponding to program syndication verification, copyright marking, media research, closed caption data or the like, is loaded into the digital data load circuit 32 which includes a ring shift register 38 (FIG. 2), under the control of the control circuit 34. More specifically, the digital data is loaded into the ring shift register 38 (FIG. 2) which is enabled by the control circuit 34 by way of a READY TO LOAD signal. The READY TO LOAD signal is asserted initially at the beginning of the modulation and thereafter once all the data is shifted out of the ring shift register 38. After the data is loaded into the digital data load circuit 32, the digital data load circuit 32 asserts a LOAD COMPLETE signal which, in turn, is applied to the control circuit 34. After the LOAD COMPLETE signal is asserted, the control circuit 34 asserts a START MODULATION signal which is synchronized with the vertical sync signal such that the START MODULATION signal is asserted at the beginning of the first frame following the assertion of the LOAD COMPLETE signal. As will be discussed below, once all of the data is shifted out of the shift register 38 the modulation is complete and a MODULATION COMPLETE signal is asserted and applied to the control circuit 34 which, in turn, asserts a READY TO LOAD signal in order to allow additional digital data to be shifted into the digital data load circuit 32. The modulated data available on lines 40 and 42 at the output of the modulators 22 and 24 is applied to the signal mixer 36 along with the composite video signal available on line 44. The resulting signal available at the output of the signal mixer signal 36 may then be transmitted to a suitable video signal receiver, such as a television or a video cassette recorder.

As will be appreciated by those of ordinary skill, the control circuit 34 may be implemented in various ways. For example, in one embodiment, the control circuit 34 may include a microcontroller which includes a microprocessor as well as a plurality of input/output ports. In such an embodiment, the horizontal and vertical sync signals are applied to on-board time differentiators. The microcontroller, in turn, controls the loading of the data into the digital data load circuit 32 as well as control the modulators 22 and 24 in a manner as discussed above.

A modulation circuit which may be used to implement the modulators 22 and 24 is illustrated in FIG. 2, illustrated within the dashed box. The modulation circuit shown in FIG. 2 illustrates a circuit for converting the signal to a spread spectrum signal. However, it will be appreciated by those of ordinary skill in the art that other types of modulation circuits, including other types of spread spectrum circuits, are within the broad scope of the invention. Moreover, in order to transmit data on two channels, two modulators 22 and 24 are illustrated. The principles of the present invention, however, are applicable to single channel systems in which a single modulator 22 or 24 is utilized as well as various multi-channel systems utilizing more than two modulators.

The modulation circuit includes a first pseudo random generator 45 for varying the active video lines upon which the modulated data is displayed and may include a second pseudo random generator 46 for modulating the digital data at a relatively low modulation level. In addition, the modulators 22 and 24 may include a modulation complete reset counter 48, a repeat counter 50, a clock source 52, as well as an exclusive OR gate 54 for the spread spectrum modulation. As discussed above, the digital data is loaded into the ring shift register 38 under the control of the READY TO LOAD signal. Once the data is loaded into the ring shift register 38, the LOAD COMPLETE signal is asserted. The modulation is then synchronized with the horizontal and vertical sync pulses. More specifically, the START MODULATION signal is asserted by the control circuit 34 beginning with the first field after the LOAD COMPLETE signal is asserted. After the LOAD COMPLETE signal is asserted, The START MODULATION signal is then used to control the repeat counter 50 which, in turn, is used to shift data out of the ring shift register 38 where it is modulated by way of the exclusive OR gate 54 with a pseudo random sequence generated by the pseudo random generator 46. The pseudo random generator 46 is clocked by the clock source 52 which generates pulses at the video pixel frequency.

In order to improve the reliability of the data transmission, one embodiment of the invention contemplates repeating data bits. As such, multiple video lines may be used to encode a given bit and the repeated bits in the digital data stream. Accordingly, the repeat counter 50 counts the number of video lines used to encode a bit and the repeated bits. More specifically, an output of the pseudo random generator 45 which selects the video lines for displaying the digital data is applied to the repeat counter 50. The repeat counter 50 is, in turn, able to count the number of video lines used to encode a bit and the repeated bits. After a given bit and the repeated bits are encoded, the repeat counter 50 controls the ring shift register 38 in order to shift the digital data in the ring shift register 38 one bit. The repeat counter 50 also clocks the modulation complete reset counter 48 in order to count the number of bits that have been encoded.

The modulation complete reset counter 48 may be a down counter; set to the length of the digital data stream to be encoded. The counter 48 may then be decremented by one whenever a bit has been encoded as determined by the repeat counter 50. The modulation complete reset counter 48 is reset at the beginning of each field. After a given field has been encoded, the modulation complete reset counter 48 asserts the MODULATION COMPLETE signal; utilized by the control circuit 34 as discussed above.

The demodulation circuits are illustrated in FIGS. 3 and 4. More specifically, the overall block diagram for the demodulator circuit is illustrated in FIG. 3. The demodulator circuit includes a sync recovery circuit 56 for recovering the horizontal and vertical sync signals from the modulated video signal. The horizontal and vertical sync signal are applied to a demodulator control circuit 58. The demodulator control circuit 58, which may include a microcontroller, similar to the control circuit 34 as discussed above, asserts a START RECOVERY signal at the beginning the first line in a new field. The START RECOVERY signal is applied to two signal recovery circuits 60 and 62. The signal recovery circuits 60 and 62 correspond to the modulators 22 and 24, respectively and include the pseudo random sequences for both the spread spectrum modulation as well as the raster line selection.

The signal recovery circuits 60 and 62 are under the control of a free running clock 64. A horizontal sync pulse is applied to the clock 64 in order to synchronize the clock 64 with the beginning of a horizontal video line. The clock 64 runs at the video pixel frequency, similar to the clock 52 (e.g., 700 dots per line).

The modulated video signal is digitized by an analog to digital converter (ADC) 66. The output of the ADC 66 is applied to the signal recovery circuits 60 and 62. The data bit stream length is applied to each of the signal recovery circuits 60 and 62. This enables the signal recovery circuits 60 and 62 to assert a RECOVERY COMPLETE signal to the demodulator control circuit 58 whenever a particular data bit stream has been recovered.

The signal recovery circuits 60 and 62 may be implemented as illustrated in FIG. 4. The signal recovery circuits 60 and 62 include a chirp sequence shift register 68 and a raster hop shift register 70. These shift registers 68 and 70 may be shift registers which are preloaded with the pseudo random sequences generated by the pseudo random generators 45 and 46. Alternatively, the chirp sequence shift register 68 and the raster hop shift register 70 may also be pseudo random generators which generate the same sequences as the pseudo random generators 45 and 46.

The digitized video signal is applied to a digital accumulator 72 which performs the demodulation function. More specifically, the digitized video signal is added or subtracted to the running value of a digital accumulator 72 under the control of the chirp sequence shift register 68. Since both the digital accumulator 62 and chirp sequence shift register 68 are synchronized to the clock 64, an addition or subtraction operation will be performed for each clock cycle. Thus at the end of each clock cycle the digital accumulator 72 generates a sign bit which is representative of the polarity of the running sum generated by the repetititve addition/subtraction operations. The sign bit is thus representative of the decoded data signal The raster hop shift register 70 is preloaded with the same pseudo random sequence as the pseudo random generator 45. The raster hop shift register 70 is reset by a START RECOVERY signal which, as previously mentioned, is asserted by the demodulator control circuit 58. The raster hop shift register 70 is clocked by a horizontal sync pulse which clocks the raster hop shift register 70 at the beginning of each video line. The raster hop shift register 70 is then used to control the chirp sequence shift register 68. More specifically, the chirp sequence shift register 68 is clocked by the clock 64. The raster hop shift register 70 functions to either enable or reset the chirp sequence shift register 68 according to the sequence generated by the pseudo random generator 26 under the control of the clock 64.

The chirp sequence shift register 68 generates a BEGIN CHIRP SEQUENCE signal and an END CHIRP SEQUENCE to control the demodulation of the digitized data signal. More specifically, the BEGIN CHIRP SEQUENCE signal is asserted to the digital accumulator 72 and is responsive to the START RECOVERY signal asserted by the demodulator control circuit 58 such that the BEGIN CHIRP SEQUENCE signal is asserted at the beginning of the next field in the video frame after the START RECOVERY signal is asserted by the demodulator control circuit 58. Once the chirp sequence bits are shifted out of the chirp sequence shift register 68 an END CHIRP SEQUENCE signal is asserted.

As previously mentioned, in order to improve the reliability of the data transmission, the data bits in the data bit stream may be repeated. In this embodiment of the invention a bit repeat counter 74 is utilized to count the number of bit retransmissions. More specifically, the bit repeat counter 74 is implemented as an up counter for counting the number of bit retransmissions. For example, if the digital data to be transmitted is, for example the binary number 10110110 this data could be transmitted as 111000111111000111111000. In this example, the number of bit transmissions is two. Thus the bit repeat counter 74 would be adapted to count the original bit plus two bit retransmissions. This bit repeat counter 74 is thus reset every time the START RECOVERY signal is asserted as well as after every three bit counts. The bit repeat counter 74 is incremented by the END CHIRP SEQUENCE signal asserted by the chirp sequence shift register 68 at the end of each bit time. The bit repeat counter 74 asserts an END REPEAT signal at the end of the last retransmission. As will be discussed below, the END REPEAT signal is used to control a majority selector 76.

As previously mentioned, the sign bit output from the digital accumulator 72 represents the decoded data. These sign bits are applied to a bit shift register 78. The bit shift register 78 is a shift register used to store the data bits recovered repeatedly after demodulation. The bit shift register 78 is loaded at the end of each demodulation sequence by the END CHIRP SEQUENCE signal.

The data bits including the retransmitted bits from the bit shift register 78 are applied to the majority selector 76. The majority selector 76 generates a RECOVERED BIT signal at a predetermined number which may represent the majority of the total of the bits as well as the retransmitted bits. Thus in the previous example, if each data bit is repeated twice, the majority selector would generate a RECOVERED BIT signal after three bits were recovered under the control of the END REPEAT signal asserted by the bit repeat counter 74. The recovered bits from the majority selector 76 are then shifted into a recovered data shift register 80. The recovered data shift register 80 is under the control of the END REPEAT signal such that one bit is shifted into this shift register 80 at the end of the retransmission sequence for each bit. The output of the recovered data register 80 thus represents the recovered digital data that was transmitted.

The circuitry also includes a data stream length counter 82 which may be implemented as an up counter; set to the length of the digital bit stream. This counter 82 asserts a RECOVERY COMPLETE signal when the data bit stream has been recovered which is applied to the demodulator control circuit 58 as discussed above. The data stream length counter 82 is reset by the START RECOVERY signal and also after the counter has counted up to the number of bits in the digital data stream. The data stream length counter 82 is under the control of the END REPEAT signal which increments the counter 82 after each bit as well as the retransmitted bits are recovered. Once the counter 82 is incremented to the number of bits in the digital bit stream, the RECOVERY COMPLETE signal is asserted.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A co-channel communication system for transmitting one or more data signals concurrently with a raster type video signal comprising:
   means for modulating said data signals;
   means for pseudo randomly selecting video lines on which said data signals are to be modulated; and
   means for combining said modulated data signals with said video signal on said pseudo randomly selected video lines of the video raster.

2. A co-channel communication system as recited in claim 1, wherein said modulating means includes means for converting said data signal to a spread spectrum signal.

3. A co-channel communication system as recited in claim 1, wherein said modulating means includes means for modulating said data signal according to a pseudo-random sequence.

4. A co-channel communication system as recited in claim 1, wherein said pseudo random selecting means includes means for selecting said video lines according to a pseudo-random sequence.

5. A co-channel communication system as recited in claim 1, wherein said pseudo randomly selected video lines are in an active portion of the video raster.

6. A co-channel communication system for transmitting and receiving a signal comprising a raster type video signal and a data signal comprising:
   means for modulating said data signal;
   means for pseudo randomly selecting video lines on which said data signal is to be modulated;
   means for combining said modulating data signal and said video signal on said pseudo randomly selected video lines;
   means responsive to said combining means and said pseudo randomly selecting means for transmitting said combined signal;
   means for receiving said combining signal; and
   means for recovering said data signal from said combined signal.

7. A co-channel communication system as recited in claim 6, wherein said modulating means includes means for modulating said data signal according to a pseudo-random sequence.

8. A co-channel communication system as recited in claim 7, wherein said randomly selected video lines are in an active area of the video raster.

9. A co-channel communication system as recited in claim 6, wherein said modulating means includes means for converting said data signal to a spread spectrum signal.

10. A co-channel communication system as recited in claim 6, further including means for retransmitting said modulated data signal.

11. A co-channel communication system as recited in claim 6, wherein said recovering means includes means for storing the digital data after a predetermined portion of said retransmitted modulated data signal has been recovered.

12. A co-channel communication system for receiving a data signal concurrently transmitted with a raster type video signal, comprising:
    means for demodulating pseudo randomly selected video lines, said pseudo randomly selected video lines being selected according to a pseudo-random sequence; and
    means for recovering said data signal from said pseudo randomly selected video lines.

13. A co-channel communication system as recited in claim 12, wherein said demodulating means includes means for demodulating said data signal according to a pseudo-random sequence.

14. A co-channel communication system as recited in claim 12, wherein said pseudo randomly selected video lines are in an active portion of the video raster.

15. A co-channel communication system as recited in claim 12, wherein said demodulating means includes means for demodulating a spread spectrum signal.

16. A method for transmitting one or more data signals with a raster type video signal on one or more predetermined channels in a manner such that the data is imperceptible to a viewer viewing a display of the video signal comprising the steps of:
    (a) modulating the data signal;
    (b) pseudo randomly selecting video lines on which to modulate the data signal; and,
    (c) combining said modulated data signal with a raster type video signal on said pseudo randomly selected video lines of a video raster.

17. A method as recited in claim 16, wherein step (a) includes the step of converting said data signal to a spread spectrum signal.

* * * * *